United States Patent
Roberts

(10) Patent No.: US 9,829,910 B2
(45) Date of Patent: Nov. 28, 2017

(54) HARMONIC ARBITRARY WAVEFORM GENERATOR

(71) Applicant: Brock Franklin Roberts, Albuquerque, NM (US)

(72) Inventor: Brock Franklin Roberts, Albuquerque, NM (US)

(*) Notice: Subject to any disclaimer, the term of this patent is extended or adjusted under 35 U.S.C. 154(b) by 0 days.

(21) Appl. No.: 14/544,534

(22) Filed: Jan. 16, 2015

(65) Prior Publication Data

US 2016/0209864 A1  Jul. 21, 2016

(51) Int. Cl.
*H03B 19/00* (2006.01)
*G06F 1/03* (2006.01)

(52) U.S. Cl.
CPC .................. *G06F 1/0321* (2013.01)

(58) Field of Classification Search
CPC .......... G06F 1/022; G06F 1/03; G06F 1/0321; G06F 1/0328; G06F 1/0335; H03B 19/00
USPC ......................................... 327/105, 106, 107
See application file for complete search history.

(56) References Cited

U.S. PATENT DOCUMENTS

| | | | | |
|---|---|---|---|---|
| 3,562,556 A * | 2/1971 | Barber | ...................... | H04J 1/04 327/105 |
| 3,629,509 A * | 12/1971 | Glaser | ................... | H03H 19/002 370/535 |
| 3,649,922 A * | 3/1972 | Ralph | ....................... | G06G 7/28 327/105 |
| 4,992,754 A * | 2/1991 | Blauvelt | ............... | H03F 1/3252 327/100 |
| 5,424,680 A * | 6/1995 | Nazarathy | ............. | H03F 1/3252 327/133 |
| 5,648,982 A * | 7/1997 | Durrant | ................... | H04B 1/707 375/146 |
| 5,661,424 A * | 8/1997 | Tang | ....................... | H03B 21/00 327/105 |
| 5,745,846 A * | 4/1998 | Myer | ....................... | H04B 1/28 330/126 |
| 7,840,199 B2 * | 11/2010 | Krishnaswamy | ........ | H01Q 3/26 327/105 |
| 2005/0239430 A1 * | 10/2005 | Shah | ......................... | H03D 7/14 455/326 |
| 2009/0315622 A1 * | 12/2009 | Suzuki | ................... | H03F 1/0261 330/124 R |
| 2012/0299579 A1 * | 11/2012 | Knierim | ............. | G01R 13/0272 324/76.23 |
| 2014/0285251 A1 * | 9/2014 | Carlson | ................ | H03D 7/1408 327/361 |

* cited by examiner

*Primary Examiner* — William Hernandez

(57) ABSTRACT

High frequency arbitrary waveforms have applications in radar, communications, medical imaging, therapy, electronic warfare, and charged particle acceleration and control. State of the art arbitrary waveform generators are limited in the frequency they can operate by the speed of the Digital to Analog converters that directly create their arbitrary waveforms. The architecture of the Harmonic Arbitrary Waveform Generator allows the phase and amplitude of the high frequency content of waveforms to be controlled without taxing the Digital to Analog converters that control them. The Harmonic Arbitrary Waveform Generator converts a high frequency input, into a precision, adjustable, high frequency arbitrary waveform.

5 Claims, 1 Drawing Sheet

HARMONIC ARBITRARY WAVEFORM GENERATOR

FEDERALLY SPONSORED RESEARCH

Figure 1:
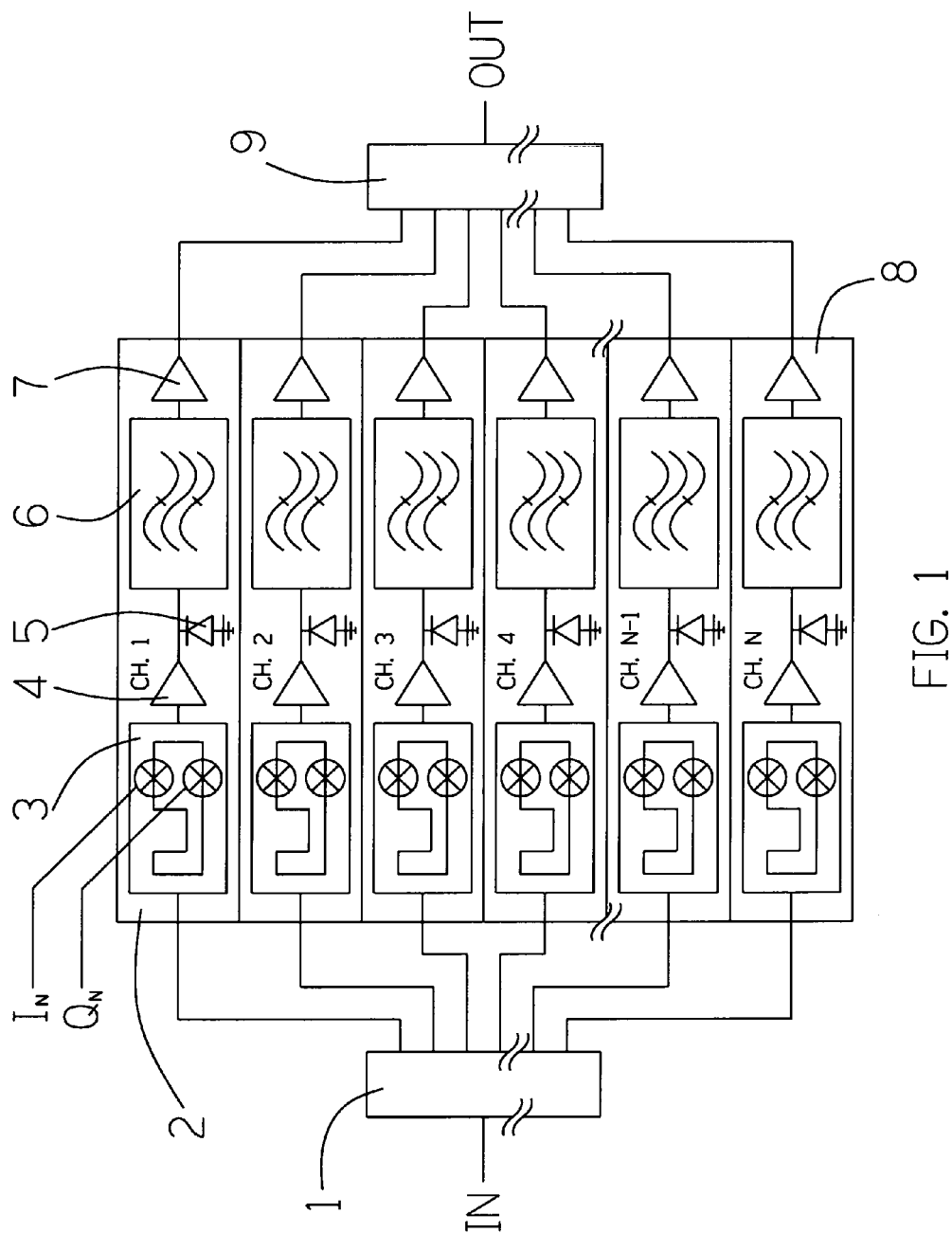

This invention has been reduced to practice thanks to the Department of Energy's Office of Science, Nuclear Physics program, and the Small Business Innovative Research program, grant number DE-SC0009509.

CROSS REFERENCE TO RELATED APPLICATIONS

This application claims the benefit of provisional patent Ser. No. 61/964,916 filed by Brock F. Roberts.

BACKGROUND

Arbitrary waveform generators are limited in frequency by the speed and resolution of the digital to analog converters they use to create their waveforms.

Advantages

The frequency limitations of available arbitrary waveform generators inspired the design of the harmonic arbitrary waveform generator from a fundamentally different method; Fourier's approach to waveform building. Fourier's theorem summarizes the concept that any periodic waveform can be created by the sum of many harmonic sinusoidal waves.

The design of the harmonic arbitrary waveform generator applies this concept by dividing a high frequency sinusoidal input into multiple channels. Each channel is equipped to independently control the phase and amplitude of its portion of the high frequency input. Precise control of phase and amplitude can be accomplished with integrated circuits called in-phase/quadrature modulators, or IQ modulators, that are designed to accept DC control voltages. Manipulating the I and Q control voltages simultaneously controls the phase and amplitude of the sinusoidal signal transmitted through the modulator. Each channel has an IQ modulator so that the phase and amplitude of each channel can be independently controlled. This can be done by computer control using Digital to Analog Converters, or DAC's to control of the I and Q voltages of each channel.

The output of each channel's IQ modulator is then amplified to drive a harmonic comb generator. Step recovery diodes can be used for this purpose. Their fast breakdown can be driven at microwave frequencies to produce a vast spectrum of harmonics of the drive signal. Harmonic comb generation is a coherent process; a shift in the phase of the driving sine wave results in phase shifts of all of the frequencies of the harmonic comb. The resultant phase shift of any harmonic is simply a multiple of its harmonic number and the phase shift of the driving sine wave; for example the third harmonic shifts three degrees for every degree the driver shifts. Changing the amplitude of the drive signal changes the amplitude of the harmonics generated.

Each channel has a different band pass filter that passes a single different frequency of its harmonic comb. This is followed by an amplifier to increase the power to desired levels. The outputs of all of the channels are combined with a wide band power combiner. The superposition of many independently controlled harmonics constitutes a variable arbitrary waveform with the same frequency as the input.

DRAWINGS FIGURE

FIG. 1 is a diagram of the invention.

REFERENCE NUMERALS IN DRAWING

1. N-way divider
2. Channel 1
3. Phase/Amplitude modulator
4. Amplifier
5. Harmonic comb generator
6. Band pass filter
7. Harmonic amplifier
8. Channel N
9. N-way combiner

DESCRIPTION OF THE INVENTION

The harmonic arbitrary waveform generator converts a high frequency sinusoidal input into an arbitrary waveform with the same frequency as the input. A high frequency input, labeled (IN) in FIG. 1, enters the N-way divider (1), and is distributed to N channels. Channel 1 (2), shows an internal diagram that is common to all of the channels. Each IQ modulator (3) controls the phase and amplitude of its portion of the high frequency input in response to external manipulation of the ($I_N$) and ($Q_N$) control inputs. The output of each IQ modulator is increased by an amplifier (4), and drives a harmonic comb generator (5). A single frequency of each harmonic comb passes through a band pass filter (6) and is amplified by a harmonic amplifier (7). Each channel, Channel 1 through Channel N (8) is identical except for the pass band of the filters (6) and the operating frequency of the harmonic amplifiers (7) so that each channel pass and amplify a different single harmonic of the input. All of these harmonics are then recombined by the N-way combiner (9). The superposition of these N harmonics at the output, labeled (OUT), is a controllable high frequency arbitrary waveform.

Operation of the Invention

In operation, a microprocessor or computer controls digital to analog converts that apply voltages to the IQ modulators. These can be multiplexed to each channel, or connected in parallel. The desired frequency of the arbitrary waveform drives the input of the power divider. Each channel creates a harmonic that is a manifestation of the desired arbitrary waveforms Fourier series. The resolution of the waveform can be increased by increasing the number of channels.

Advantages

The Harmonic Arbitrary Waveform Generator has significant advantages over waveform generators that use fast digital to analog converters to directly create their waveforms. This is because all digital control of phase and amplitude are done at the input frequency, rather than at the frequencies reflected by the output waveforms frequency components. The design is insensitive to differences in the phase length between channels and has no dispersion until the harmonics are recombined at the output. Because each channel is completely independent from one another there are no inter-modulation products created in the amplifiers that would lead to errors. Because the phase shifters are endless, any phase error due to line length, the phase length of the amplifier, or dispersion (once a cable is attached), can be calibrated out. Additionally there is no limit to the resolution of the resultant waveform, as additional harmonics can be superimposed to the waveform by adding new channels.

CONCLUSIONS RAMIFICATIONS AND SCOPE

Accordingly, the reader will see that there are many advantages of the harmonic arbitrary waveform generator. Precise control of the high frequency content of an arbitrary waveform is conducted at the fundamental frequency of the output waveform. This allows precision high frequency arbitrary waveforms to be created with relatively low speed electronic controls.

While the description of the invention contains specific details, these should not be taken as limitations in the scope of the invention, but as an example of an embodiment of it. Other variations are possible, for example, additional filtering or amplification could be inserted before or after the power combiner to suit the specific needs of the application. Frequency flexible band pass filters could be used to make a frequency flexible harmonic arbitrary waveform generator. High power arbitrary waveforms can be generated using and gangs of narrow band amplifiers, a series of medium band amplifiers or a single wideband amplifier. Dispersion through the amplifiers in any of these arrangements can be corrected by the independent electronic control of each harmonic produced by the Harmonic Arbitrary Waveforms Generator.

I claim:

1. An apparatus for transforming a substantially sinusoidal input signal into a controllable arbitrary waveform output signal, comprising:
  a divider connected to receive the input signal, for dividing the input signal into a plurality of channels;
  wherein each one of the channels connected to receive a portion of the input signal from the divider and operable to modulate the phase and the amplitude of the channel's portion of the input signal in response to an external control and create a modulated signal, to drive a harmonic comb generator with the modulated signal to generate a harmonic comb, and to filter the harmonic comb to transmit a single harmonic signal from the harmonic comb, wherein the plurality of channels provide a complement of harmonics of the input; and
  a combiner connected to receive the single harmonic signals transmitted by the plurality of channels for combining the single harmonic signals to provide the controllable arbitrary waveform output signal, whereby the substantially sinusoidal input signal is transformed into the controllable arbitrary waveform output signal;
  wherein each said channel includes:
    a phase/amplitude modulator that is externally controllable for modulating the phase and amplitude of the channel's input signal portion creating the modulated signal;
    a harmonic comb generator that is connected to be driven by the modulated signal for generating the harmonic comb of the modulated signal; and
    a bandpass filter that is connected for filtering the harmonic comb and for transmitting the single harmonic signal from the harmonic comb generator to the combiner.

2. The apparatus according to claim 1, wherein the phase/amplitude modulators are I/Q modulators.

3. The apparatus according to claim 2, wherein the external control of each said phase/amplitude modulators is provided by the analog outputs of digital to analog converters.

4. The apparatus according to claim 1, wherein each said channel further includes:
  a harmonic amplifier connected to receive the single harmonic signal from the bandpass filter for amplifying the single harmonic signal to create an amplified harmonic signal, and for transmitting the amplified harmonic signal to the combiner.

5. The apparatus according to claim 1 wherein each said channel further includes:
  an amplifier connected to receive the modulated signal from the phase/amplitude modulator for amplifying the modulated signal and creating an amplified modulated signal and connected for driving the harmonic comb generator with the amplified modulated signal.

* * * * *